US010610823B2

(12) United States Patent
Ashton et al.

(10) Patent No.: US 10,610,823 B2
(45) Date of Patent: Apr. 7, 2020

(54) FLUID SEPARATION MODULE

(71) Applicant: EATON LIMITED, Titchfield Hampshire (GB)

(72) Inventors: Dominic Ashton, Ladera Ranch, CA (US); Rudy Haryanto Rusali, Fountain Valley, CA (US); Alan Ernest Massey, Southampton (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 414 days.

(21) Appl. No.: 15/510,269

(22) PCT Filed: Sep. 10, 2015

(86) PCT No.: PCT/EP2015/070705
§ 371 (c)(1),
(2) Date: Mar. 10, 2017

(87) PCT Pub. No.: WO2016/038138
PCT Pub. Date: Mar. 17, 2016

(65) Prior Publication Data
US 2017/0296964 A1 Oct. 19, 2017

Related U.S. Application Data

(60) Provisional application No. 62/049,694, filed on Sep. 12, 2014.

(51) Int. Cl.
*B01D 53/22* (2006.01)
*B01D 53/26* (2006.01)
*B64D 37/32* (2006.01)
*C01B 21/04* (2006.01)
(Continued)

(52) U.S. Cl.
CPC .......... *B01D 53/229* (2013.01); *B01D 53/22* (2013.01); *B01D 53/26* (2013.01); *B64D 13/00* (2013.01);
(Continued)

(58) Field of Classification Search
CPC .............................. B64D 13/00; B64D 13/06; B64D 2013/0662; B64D 37/32; B01D 2257/80;
(Continued)

(56) References Cited

U.S. PATENT DOCUMENTS 4,750,925 A * 6/1988 MacLean ............... B01D 53/04
62/624
6,491,739 B1 12/2002 Crome et al.
(Continued)

FOREIGN PATENT DOCUMENTS

EP 0692297 A2 1/1996
WO WO 0228714 A1 4/2002
WO WO 2014075850 A1 4/2014

*Primary Examiner* — Anthony R Shumate
(74) *Attorney, Agent, or Firm* — Leydig, Voit & Mayer, Ltd.

(57) ABSTRACT

A fluid system includes an inlet conduit disposed in a fluid flow path between a fluid source and a fluid destination. The fluid conduit includes a fluid mixing portion. The fluid system includes a fluid separation module disposed in the flow path downstream of the constriction between the source and the destination. The fluid separation module includes a first fluid separator. The fluid system includes a second fluid separator disposed in the flow path upstream of the first fluid separator. The fluid system includes a feedback conduit that may provide fluid communication between an outlet of the fluid separation module and the fluid mixing portion.

30 Claims, 4 Drawing Sheets

(51) Int. Cl.
*C01B 13/02* (2006.01)
*B64D 13/00* (2006.01)
*B64D 13/06* (2006.01)

(52) U.S. Cl.
CPC .......... *B64D 37/32* (2013.01); *C01B 13/0251* (2013.01); *C01B 21/0438* (2013.01); *B01D 2053/224* (2013.01); *B01D 2256/10* (2013.01); *B01D 2257/104* (2013.01); *B01D 2257/80* (2013.01); *B01D 2259/4575* (2013.01); *B64D 13/06* (2013.01); *B64D 2013/0662* (2013.01); *C01B 2210/001* (2013.01); *C01B 2210/0045* (2013.01)

(58) Field of Classification Search
CPC ...... B01D 2053/224; B01D 2259/4575; B01D 53/26; B01D 53/229; B01D 2257/104; B01D 2256/10; B01D 53/22; C01B 2210/001; C01B 13/0251; C01B 2210/0045; C01B 21/0438
See application file for complete search history.

(56) References Cited

U.S. PATENT DOCUMENTS

| | | | |
|---|---|---|---|
| 2004/0065778 | A1 | 4/2004 | Jones |
| 2009/0013870 | A1* | 1/2009 | Sorensen ............ B01D 53/229 95/96 |
| 2011/0023710 | A1* | 2/2011 | Sorensen ............ B01D 53/229 95/50 |
| 2012/0168092 | A1* | 7/2012 | Keckler, III ......... B01D 3/4216 159/16.1 |
| 2014/0124443 | A1* | 5/2014 | McGinnis ............ B01D 61/002 210/640 |
| 2015/0129413 | A1* | 5/2015 | Huang ................. B01D 53/226 203/39 |
| 2015/0336046 | A1 | 11/2015 | Ungerank et al. |
| 2017/0320009 | A1* | 11/2017 | Hirata .................... B01D 61/58 |
| 2018/0085705 | A1* | 3/2018 | Barnes ............... B01D 53/0473 |
| 2018/0223205 | A1* | 8/2018 | Mitariten ............ B01D 53/229 |
| 2019/0060835 | A1* | 2/2019 | Ding ...................... B01D 61/36 |

\* cited by examiner

FLUID SEPARATION MODULE

CROSS-REFERENCE TO RELATED APPLICATIONS

This application is a U.S. national stage application under 35 U.S.C. § 371 of International Application No. PCT/EP2015/070705, filed on Sep. 10, 2015, and claims the benefit of U.S. Provisional Application Ser. No. 62/049,694, filed Sep. 12, 2014, the disclosure of which is incorporated herein by reference in its entirety. The International Application was published in English on Mar. 17, 2016, as WO 2016/038138 A1 under PCT Article 21(2).

FIELD

The present disclosure relates to a fluid separation module, including a fluid separation module that may be used in an aircraft.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Vehicles, such as aircraft, often include one or more areas in which it is desirable for inert air to exist, such as fuel tanks and cargo holds. Inert air may be desirable, for example, to help prevent unintended ignition of fuel in fuel tanks or combustible materials in cargo holds. An air separation module ("ASM") may be configured for separating air into inert portions (e.g., Nitrogen) and reactive portions (e.g., Oxygen). In certain situations, air incoming to the ASM may include excess moisture that may impair functionality or longevity of the ASM. In other situations, air exiting a moisture-reducing component (e.g., a coalescer), may drop in temperature before it reaches the ASM, causing undesirable condensation on tubes or in the ASM.

There is therefore a desire for solutions/options that minimize or eliminate one or more of the above-described shortcomings. The foregoing discussion is intended only to illustrate the present field and should not be taken as a disavowal of scope.

SUMMARY

An aspect of the invention provides a fluid system, comprising: an inlet conduit disposed in a fluid flow path between a fluid source and a fluid destination; a fluid mixing portion disposed in the inlet conduit; a fluid separation module disposed in the fluid flow path downstream of the fluid mixing portion, and between the source and the fluid destination, the fluid separation module including a first fluid separator; a second fluid separator disposed in the fluid flow path upstream of the first fluid separator; and a feedback conduit providing fluid communication between an outlet of the fluid separation module and the fluid mixing portion.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, a fluid separation module (FSM) may include a first fluid separator, a second fluid separator, and a fluid mixing portion. The fluid mixing portion may be configured to receive dried and separated fluid from the first fluid separator and second fluid separator and mix the dried and separated fluid with saturated incoming fluid.

A fluid system may include an inlet conduit that may be disposed in a fluid flow path between a fluid source and a fluid destination. The fluid conduit may include a fluid mixing portion. The fluid system may include a fluid separation module that may be disposed in the flow path downstream of the constriction between the source and the destination. The fluid separation module including a first fluid separator. The fluid system may include a second fluid separator that may be disposed in the flow path upstream of the first fluid separator. The fluid system may include a feedback conduit that may provide fluid communication between an outlet of the fluid separation module and the fluid mixing portion.

In embodiments, a method of separating fluid may comprise providing an inlet conduit including fluid mixing portion and/or a constriction. The method may include providing a first fluid separator and/or providing a second fluid separator in fluid communication with the inlet conduit and the first fluid separator. The second fluid separator may be disposed in a fluid flow path between the inlet conduit and the first fluid separator. The method may include receiving, into the inlet conduit, system fluid from a fluid source. The method may include receiving, in the fluid mixing portion, separated system fluid from a feedback conduit. The method may include mixing the system fluid with the separated system fluid to generate combined fluid. The method may include separating the combined fluid via the second fluid separator to generate dried fluid. The method may include separating, via the first fluid separator, the dried fluid to generate the separated system fluid.

The foregoing and other aspects, features, details, utilities, and advantages of the present disclosure will be apparent from reading the following description, and from reviewing the accompanying drawings.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention.

Figure 1A:
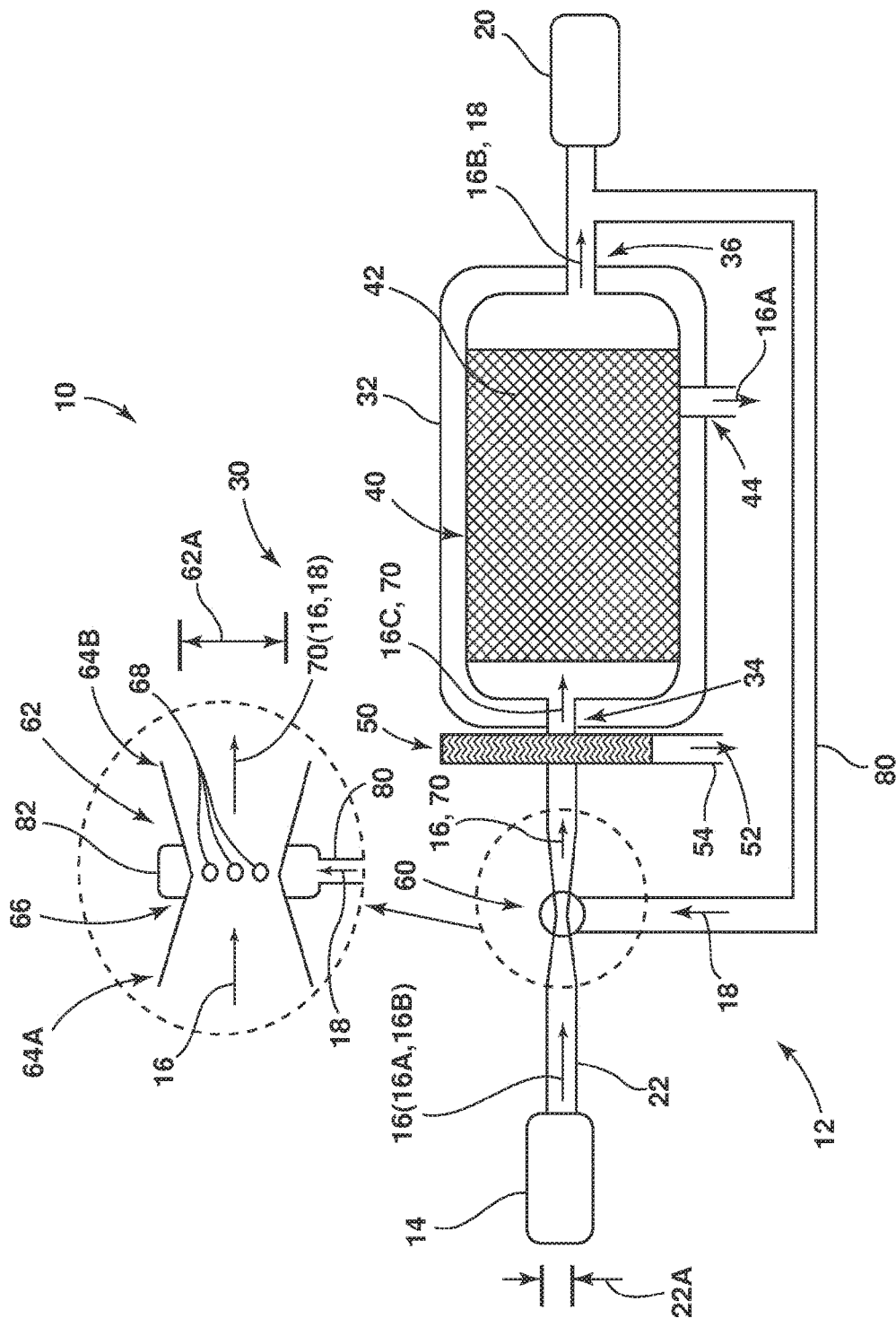
FIG. 1A a schematic view with an enlarged detail portion generally illustrating an embodiment of a fluid separation system according to teachings of the present disclosure.
Figure 1B:
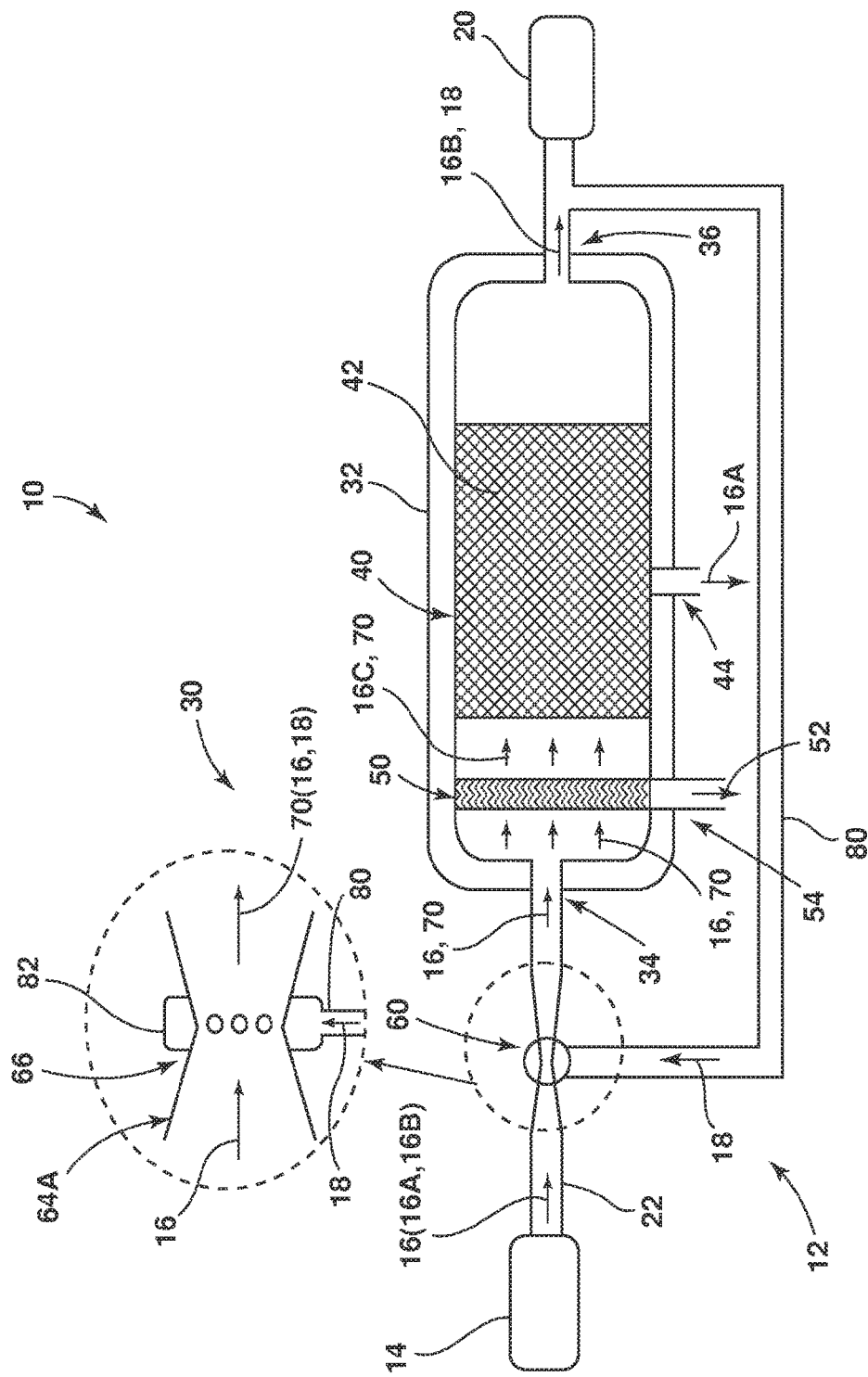
FIG. 1B a schematic view with an enlarged detail portion generally illustrating an embodiment of a fluid separation system according to teachings of the present disclosure.

Referring to FIGS. 1A and 1B, a fluid system 10 may include a fluid separation module (FSM) 30 disposed in a fluid flow path 12. Fluid flow path 12 may provide fluid communication between a source 14 of incoming fluid 16 and a fluid destination/outlet 20 for separated fluid 18. Source 14 may include one or more of a variety of possible components of a fluid system, such as, for example, a fluid filter or a heat exchanger. Incoming fluid 16 may, for example, include engine bleed fluid (e.g., bleed air), reactive portions 16A (e.g., Oxygen), and/or inert portions 16B (e.g., Nitrogen). A first fluid conduit 22 may be configured to provide fluid communication between source 14 and FSM 30. Destination 20 may include areas in which separated fluid 18 may be desired, such as, for example, a fuel tank and/or a cargo hold of an aircraft.

In embodiments, FSM 30 may include a housing 32 that may include an inlet 34, an outlet 36, a first fluid separator 40, and/or a second fluid separator 50.

In embodiments, first fluid separator 40 may be disposed in FSM housing 32 and may be configured as an air separation module. First fluid separator 40 may be configured to separate inert portions 16B from reactive portions 16A of a fluid, such as incoming fluid 16, and/or, as described in greater detail below, combined fluid 70. First fluid separator 40 may include fibers and/or a membrane 42, such as a hollow-fiber membrane, that may separate an incoming fluid (e.g., incoming fluid 16 and/or combined fluid 70) into inert portions 16B (e.g., Nitrogen enriched air (NEA)) and reactive portions 16A (e.g., Oxygen enriched air (DEA)). Reactive portions 16A that have been separated out from incoming fluid 16 by first fluid separator 40 may then flow toward and/or be directed to a second outlet 44 of FSM housing 32. Second outlet 44 may be configured as an exhaust port and/or may vent reactive portions 16A to an external environment (e.g., outside of an airplane). Separated fluid 18 may include inert portions 16B that have been separated out from incoming fluid 16 and/or combined fluid 70 by first fluid separator 40, and separated fluid 18 may flow toward and/or be directed to FSM housing outlet 36. Outlet 36 may be in fluid communication with destination 20 such that separated fluid may be provided to desired areas, such as, for example, fuel tanks and/or cargo holds. In embodiments, separated fluid may include primarily inert portions 16B and may include a small amount of reactive portions 16A. In other embodiments, separated fluid 18 may not include any or substantially any reactive portions 16A, and/or may include only inert portions 16B. Although referred to herein as inert portions, inter portions 16B may or may not be completely inert, and/or may be substantially inert (e.g., inert enough that the risk of combustion is manageable).

In embodiments, incoming fluid 16 may exit source 14 at a relatively high temperature and may cool down, at least to some degree, as it moves through first fluid conduit 22 toward FSM housing inlet 34. Cooling of incoming fluid 16 may cause at least some of incoming fluid 16 to condense, which may result in incoming fluid 16 including condensed liquid (e.g., water), condensed liquid forming on first fluid conduit 22, and/or condensed liquid forming in FSM housing 32. First fluid separator 40 may be configured primarily to separate gases, and allowing significant amounts of condensed water or other liquids to enter first fluid separator 40 may not be desirable (e.g., liquids may cause corrosion of portions of first fluid separator 40 and/or reduce the effectiveness of fibers 42).

In embodiments, FSM 30 may include a second fluid separator 50, which may be configured to reduce the liquid content of incoming fluid 16 before incoming fluid 16 is provided to first fluid separator 40 (e.g., second fluid separator may "dry" the incoming fluid 16). Second fluid separator 50 may be configured as a coalescer and/or may be referred to herein as coalescer 50. Coalescer 50 may be disposed upstream of first fluid separator 40. Coalescer 50 may be configured to receive incoming fluid 16 that may contain condensed water and/or other liquids (e.g., liquid 52). For example, and without limitation, coalescer 50 may be configured as mechanical coalescer, as an electric coalescer, and/or as a combination of a mechanical coalescer and an electrical coalescer. In embodiments, as incoming fluid 16 flows from source 14 toward destination 20, coalescer 50 may receive incoming fluid 16 and may remove some or all of the liquid 52 from incoming fluid 16. Liquid 52 removed by coalescer 50 may exit first fluid separator 40 and/or FSM 30 via third outlet 54. Coalescer 50 may then allow incoming fluid 16 from which liquid 52 has been removed (e.g., dried incoming fluid 16C) to flow toward first fluid separator 40.

In embodiments, it may be desirable to position or situate coalescer 50 relatively close to first fluid separator 40 to reduce the amount of liquid (e.g., liquid 52) that forms after dried incoming fluid 16C exits coalescer 50 and before dried incoming fluid 16C reaches first fluid separator 40. For example, and without limitation, disposing coalescer 50 close to first fluid separator 40 may reduce the distance that dried incoming fluid 16C travels between coalescer and first fluid separator 40. A reduced travel distance for dried incoming fluid 16C may reduce the amount of cooling of dried incoming fluid 16C, and, therefore, may also reduce condensing of dried incoming fluid 16C between coalescer 50 and first fluid separator 40. For applications, reduced cooling and/or condensing of dried incoming fluid 16C may help reduce the liquid content of dried incoming fluid 16C that is provided to first fluid separator 40.

In embodiments, such as generally illustrated in FIG. 1A, coalescer 50 may be disposed outside of FSM housing 32 and/or immediately proximate or adjacent to FSM housing 32. In other embodiments, such as generally illustrated in FIG. 1B, coalescer 50 may be disposed in a common housing with first fluid separator 40 (e.g., in FSM housing 32). Coalescer 50 may, for example, be disposed immediately adjacent or proximate to first fluid separator 40 and dried incoming fluid 16C that exits coalescer may be directed immediately to first fluid separator 40. Disposing coalescer 50 immediately adjacent or proximate to first fluid separator 40 may reduce the amount of condensation created by cooling of dried incoming fluid 16C between coalescer 50 and first fluid separator 40, which may reduce the amount of liquid (e.g., liquid 52) in dried incoming fluid 16C and/or in FSM housing 32.

In embodiments, fluid system 10 may include a fluid mixing portion 60 that may be disposed upstream of first fluid separator 40 and/or second fluid separator 50. Fluid mixing portion 60 may be configured to mix separated fluid 18 output from FSM housing 32 (e.g., fluid that has been dried by coalescer 50 and/or separated by first fluid separator 40) with incoming fluid 16 upstream of first fluid separator 40 and/or coalescer 50. In embodiments, such as generally illustrated in FIGS. 1A and 1B, fluid mixing portion 60 may be disposed, for example, in first fluid conduit 22 between source 14 and FSM housing 32. First fluid conduit 22 may include a diameter 22A, which may be generally constant between source 14 and FSM housing 32. In embodiments, fluid mixing portion 60 may include a constriction 62 that may include a minimum diameter (e.g., a minimum of diameter 62A of constriction 62) that is smaller than diameter 22A of first fluid conduit 22. For example, and without limitation, diameter 62A of constriction 62 may be generally about the same as diameter 22A of first fluid conduit 22 at and/or near outer portions 64A, 64B of constriction 62. In embodiments, diameter 62A of constriction 62 may taper toward middle/throat 66 of constriction 62. The minimum of diameter 62A of constriction 62 may be disposed between outer portions 64A, 64B (which may be opposite from each other) and/or may be disposed at or about the middle/throat 66 of constriction 62.

In embodiments, a smaller minimum of diameter 62A of constriction 62, relative to diameter 22A of first fluid conduit 22, may cause the velocity and/or flow rate of incoming fluid 16 to increase and/or the pressure of incoming fluid 16 to decrease as incoming fluid 16 flows from source 14 through constriction 62 toward FSM housing 32. In embodiments, diameter 62A may be determined, controlled, and/or set according to desired levels of velocity and/or flow rate of incoming fluid 16.

In embodiments, FSM 30 may include a second/feedback fluid conduit 80 that may provide fluid communication between FSM housing outlet 36 and constriction 62. FSM housing outlet 36 may receive separated fluid 18 (e.g., inert portions 16B of incoming fluid 16 that have been separated by first fluid separator 40 and/or dried by coalescer 50) and/or may be in fluid communication with destination 20 and second fluid conduit 80. Separated fluid 18 that exits FSM housing 32 may be provided to second fluid conduit 80 and may then flow to fluid mixing portion 60. Fluid mixing portion 60 may include one or more apertures 68 that may be configured to receive separated fluid 18 from second fluid conduit 80. Second fluid conduit 80 may include manifold 82, which may be disposed at an end feedback conduit 80 and/or may be configured for fluid communication with fluid mixing portion 60. Manifold 82 may be aligned with apertures 68 (e.g., such that apertures 68 are disposed generally at/in the middle of manifold 82). In embodiments, apertures 68 may be disposed/aligned at or about the middle/throat 66 of constriction 62, which may correspond to the lowest pressure area of incoming fluid 16.

Apertures 68 may be configured to take advantage of the relatively low pressure incoming fluid 16 in constriction 62 and effectively draw separated fluid 18 into the flow of incoming fluid 16 (e.g., via a Venturi effect). Disposing apertures 68 so that they are aligned with a relatively low (e.g., compared to fluid 16 at source 14 and/or fluid 16 in upstream portions of first fluid conduit 22) or even the lowest pressure area of incoming fluid (e.g., at or about middle/throat portion 66) may provide improved mixing between incoming fluid 16 and separated fluid 18. Upon exiting FSM housing 32, separated fluid 18 may include relatively low liquid content (e.g., may be relatively unsaturated), if it contains any liquid at all. In comparison with separated fluid 18, incoming fluid 16, as it approaches constriction 62, may be relatively saturated with liquid (e.g., liquid 52). Mixing unsaturated separated fluid 18 with saturated incoming fluid 16 may result in a combined fluid 70 (e.g., of incoming fluid 16 and separated fluid 18) that may include a reduced saturation (e.g., liquid content) compared to incoming fluid 16 by itself. For example, and without limitation, relatively unsaturated separated fluid 18 may effectively dilute the saturation of fluid 16. In embodiments including a fluid mixing portion 60, combined fluid 70 may be provided to coalescer 50 and/or first fluid separator 40 instead of only incoming fluid 16.

In embodiments, second fluid conduit 80 may effectively feed back/return inert portions 16B of incoming fluid 16 that have already passed through coalescer 50 and/or first fluid separator 40 (e.g., inert portions 16B that become at least part of separated fluid 18). For example, and without limitation, mixing separated fluid 18 with saturated incoming fluid 16 may involve at least some inert portions 16B flowing through coalescer 50 and/or first fluid separator 40 for a first time during an initial separation and then again a second time after being fed back to fluid mixing portion 60. In embodiments, some inert portions 16B may be fed back several and/or many times.

A Venturi effect may involve a conical body that initiates a pressure differential between an inlet and an outlet. A Venturi effect can create a vacuum inside a body that can, if desired, initiate a suction or draw through a port. In the context of embodiments of the present disclosure, apertures 68 (which may act like a Venturi inlet) may be configured to take advantage of such an effect, and of the relatively low pressure incoming fluid 16 in constriction 62, to effectively create a vacuum or otherwise draw separated fluid 18 into the flow of incoming fluid 16. In embodiments, combined fluid 70 may include a resulting mixture of incoming fluid 16 and separated fluid 18, which may flow into a downstream portion of first fluid conduit 22 (which may act like a Venturi outlet).

Figure 2:
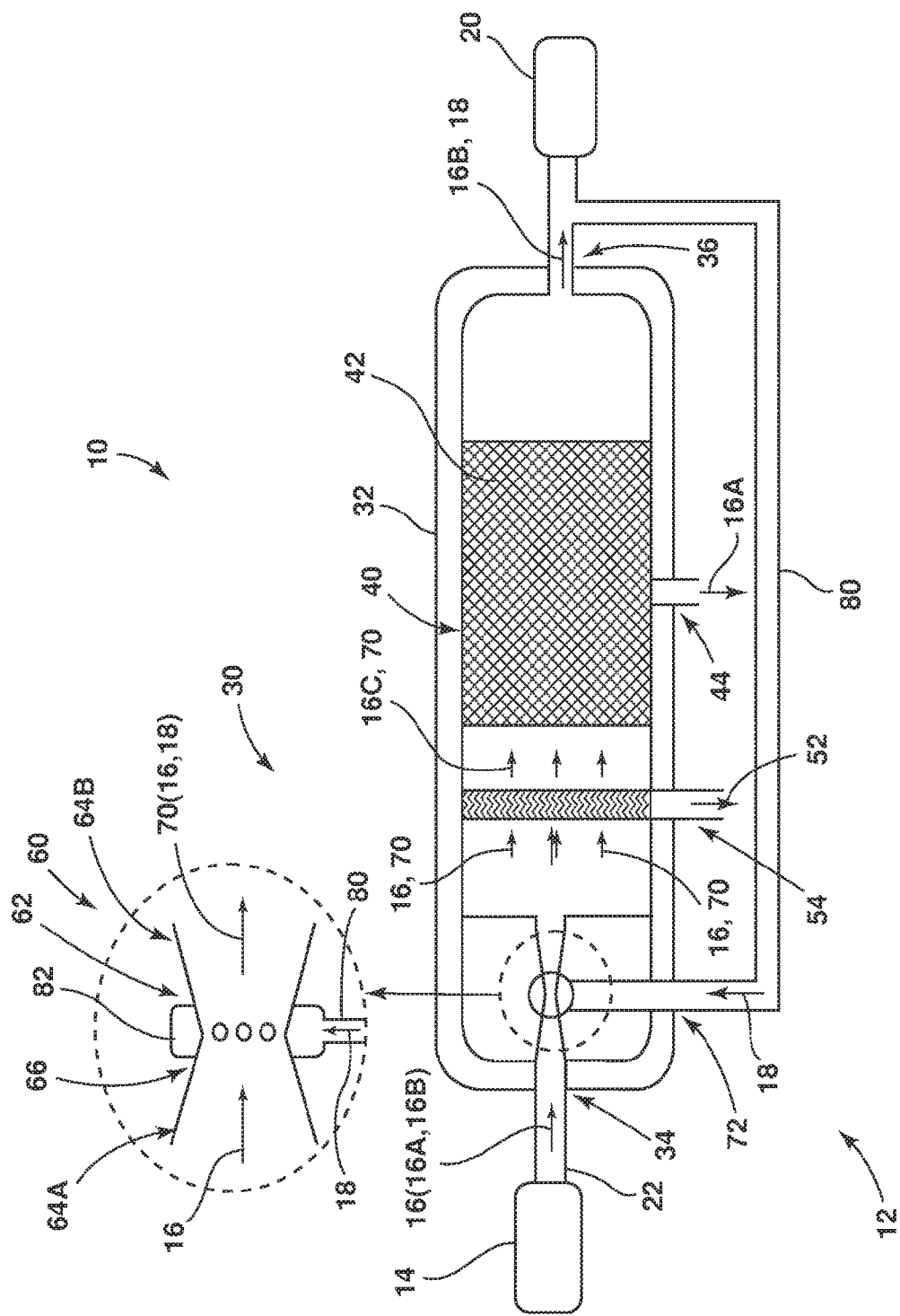
FIG. 2 a schematic view with an enlarged detail portion generally illustrating an embodiment of a fluid separation system according to teachings of the present disclosure.

In embodiments, such as generally illustrated in FIGS. 1A and 1B, fluid mixing portion 60 may be disposed in close proximity to and/or immediately adjacent to FSM housing 32. In other embodiments, as generally illustrated in FIG. 2, fluid mixing portion 60 may be disposed within a FSM housing 32, and fluid mixing portion 60 may be disposed upstream of coalescer 50 and/or first fluid separator 40. FSM housing inlet 34 may receive incoming fluid 16 from source 14, via first fluid conduit 22, and provide incoming fluid 16 to fluid mixing portion 60. FSM housing 32 may include a second inlet 72 that may be configured to allow separated fluid 18 to flow to fluid mixing portion 60. For example, and without limitation, second inlet 72 may be configured to receive at least a portion of second fluid conduit 80 and/or may provide fluid communication between second fluid conduit 80 and fluid mixing portion 60. In embodiments, second fluid conduit 80 may be disposed generally outside of FSM housing 32 and/or second fluid conduit 80 may be disposed at least partially inside of FSM housing 32 (e.g., in embodiments in which fluid mixing portion 60 is disposed inside FSM housing 32).

Figure 1C:
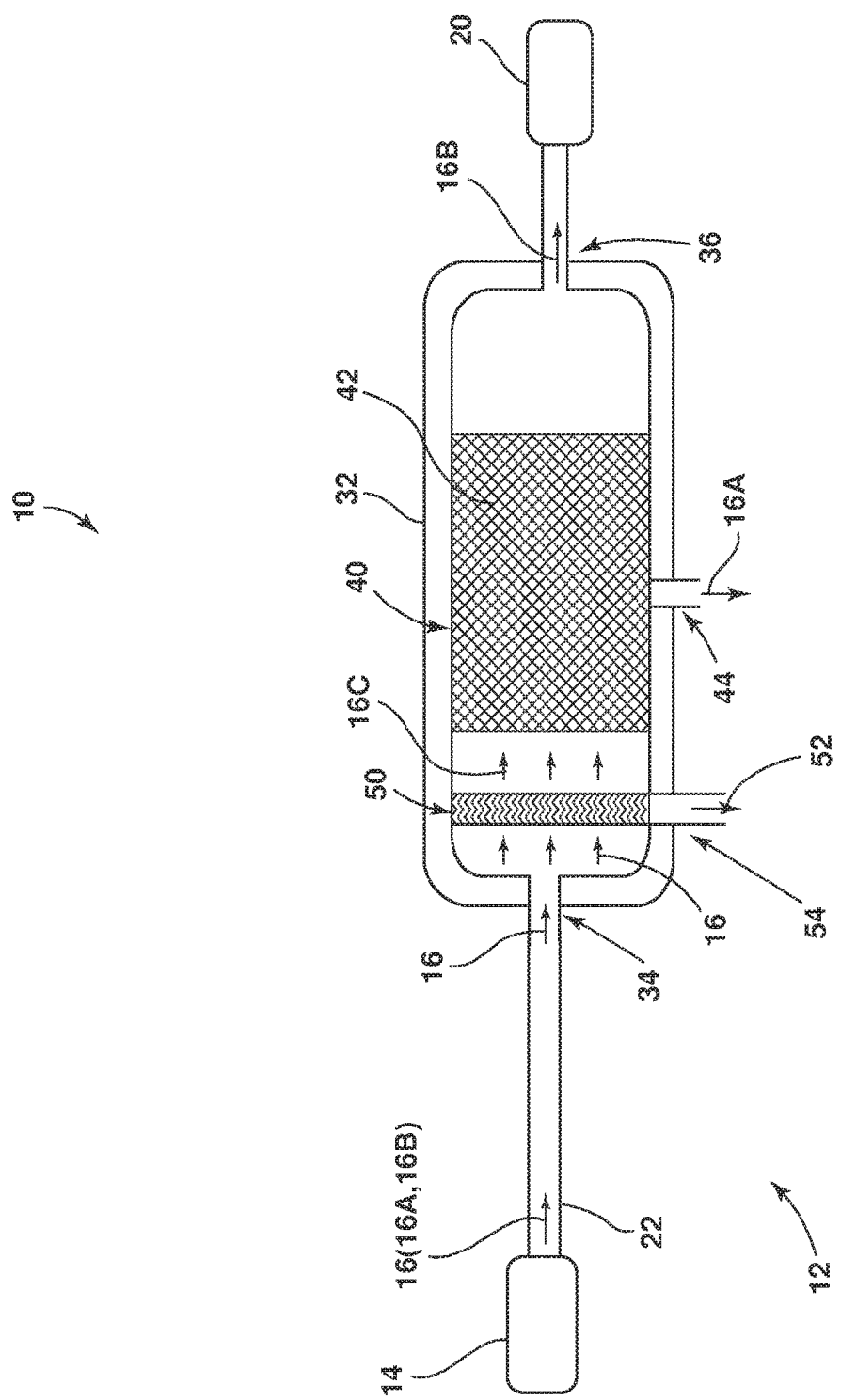
FIG. 1C a schematic view generally illustrating an embodiment of a fluid separation system according to teachings of the present disclosure.

In embodiments, such as generally illustrated in FIG. 1C, FSM 30 may not include a fluid mixing portion 60. In such embodiments, inlet 34 of FSM housing 32 may be connected directly to source 14 or inlet 34 may be directly connected to second fluid separator 50, which may be directly connected to source 14. In embodiments, outlet 36 of FSM housing 36 may be connected directly to destination 20. In embodiments, second fluid separator 50 may be disposed outside of FSM housing 32 or at least partially (or even entirely) within FSM housing 32.

In embodiments, a method of separating fluid may comprise providing an inlet conduit (e.g., first fluid conduit 22) including fluid mixing portion 60 and/or a constriction 62. The method may include providing a first fluid separator 40 and/or providing a second fluid separator 50 in fluid communication with the inlet conduit 22 and the first fluid separator 40. The second fluid separator 50 may be disposed in a fluid flow path between the inlet conduit 22 and the first fluid separator 40. The method may include receiving, into the inlet conduit 22, system fluid from a fluid source 14. The method may include receiving, in the fluid mixing portion 60, separated system fluid 18 from a feedback conduit 80. The method may include mixing the system fluid 16 with the separated system 18 fluid to generate combined fluid 70. The method may include separating the combined fluid 70 via the second fluid separator 50 to generate dried fluid 16C. The method may include separating, via the first fluid separator 40, the dried fluid 16C to generate the separated system fluid 18.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

What is claimed is:

1. A fluid system, comprising:
    an inlet conduit disposed in a fluid flow path between a fluid source and a fluid destination, the fluid destination comprising at least one of a fuel tank of an aircraft or a cargo hold of an aircraft;
    a fluid mixing portion disposed in the inlet conduit;
    a fluid separation module disposed in the fluid flow path downstream of the fluid mixing portion, and between the fluid source and the fluid destination, the fluid separation module including:
        a first fluid separator, and
        a second fluid separator disposed in the fluid flow path upstream of the first fluid separator; and
    a feedback conduit providing fluid communication between an outlet of the fluid separation module and the fluid mixing portion.

2. The fluid system of claim 1, wherein the fluid mixing portion includes a constriction, and
    wherein the constriction includes one or more apertures that permit fluid communication between the feedback conduit and the constriction.

3. The fluid system of claim 2, wherein the constriction is configured to draw fluid from the feedback conduit into at least one of the fluid mixing portion and the inlet conduit, via a Venturi effect.

4. The fluid system of claim 1, wherein the outlet comprises a first outlet,
    wherein the fluid separation module includes a housing including a first inlet and the first outlet,
    wherein the first inlet is in fluid communication with the inlet conduit, and
    wherein the first outlet is in fluid communication with the fluid destination.

5. The fluid system of claim 4, wherein the first fluid separator and the second fluid separator are disposed in the housing.

6. The fluid system of claim 5, wherein the housing includes a second outlet in fluid communication with the first fluid separator, the second outlet permitting reactive portions of fluid to exit at least one of the fluid separation module and the fluid system.

7. The fluid system of claim 6, wherein the housing includes a third outlet in fluid communication with the second fluid separator, the third outlet permitting liquid removed from fluid by second fluid separator to exit at least one of the fluid separation module and the fluid system.

8. The fluid system of claim 4, wherein the fluid mixing portion is disposed in the housing.

9. The fluid system of claim 7, wherein the housing includes a second inlet configured to provide fluid communication between the feedback conduit and the fluid mixing portion.

10. The fluid system of claim 2, wherein the feedback conduit includes a manifold disposed at an end of the feedback conduit and proximate to the one or more apertures of the constriction.

11. The fluid system of claim 2, wherein the constriction has a minimum diameter and the one or more apertures are disposed proximate the minimum diameter.

12. The fluid system of claim 2, wherein the one or more apertures are disposed in the constriction between opposing outer portions.

13. The fluid system of claim 12, wherein the opposing outer portions have diameters that are substantially equal to a diameter of a remaining portion of the inlet conduit.

14. A method of separating fluid, the method comprising:
providing an inlet conduit including a fluid mixing portion;
providing a fluid separation module including a first fluid separator;
providing a second fluid separator in fluid communication with the inlet conduit and the first fluid separator, the second fluid separator disposed in a fluid flow path between the inlet conduit and the first fluid separator;
receiving, into the inlet conduit, system fluid from a fluid source;
receiving, in the fluid mixing portion, separated system fluid from a feedback conduit;
mixing the system fluid with the separated system fluid to generate combined fluid;
separating the combined fluid via the second fluid separator to generate dried fluid; and
separating the dried fluid via the first fluid separator to generate the separated system fluid,
wherein the fluid separation module is in fluid communication with a fluid destination comprising at least one of a fuel tank of an aircraft or a cargo hold of an aircraft.

15. The method of claim 14, wherein the fluid mixing portion includes a constriction, and the constriction includes an aperture that permits fluid communication between the feedback conduit and the fluid mixing portion.

16. The method of claim 14, wherein the fluid separation module includes a housing including a first inlet and a first outlet,
wherein the first inlet is in fluid communication with the inlet conduit, and
wherein the first outlet is in fluid communication with the feedback conduit.

17. The method of claim 16, wherein the first fluid separator and the second fluid separator are disposed in the housing.

18. The method of claim 17, wherein the housing includes a second outlet in fluid communication with the first fluid separator, the second outlet permitting reactive portions of fluid to exit the fluid separation module.

19. The method of claim 18, wherein the housing includes a third outlet in fluid communication with the second fluid separator, the third outlet permitting liquid removed from fluid by second fluid separator to exit the fluid separation module.

20. The method of claim 16, wherein the fluid mixing portion is disposed in the housing.

21. The method of claim 19, wherein the housing includes a second inlet configured to provide fluid communication between the fluid conduit and the fluid mixing portion.

22. The method of claim 14, wherein the separated system fluid is less saturated than the system fluid.

23. The method of claim 14, wherein the combined fluid is less saturated than the system fluid, and the separated system fluid is less saturated than the combined fluid.

24. The method of claim 14, wherein separating the combined fluid via the second fluid separator includes removing liquid from the combined fluid.

25. A method of separating fluid, the method comprising:
providing an inlet conduit including a fluid mixing portion;
providing a fluid separation module including a first fluid separator;
providing a second fluid separator in fluid communication with the inlet conduit and the first fluid separator, the second fluid separator disposed in a fluid flow path between the inlet conduit and the first fluid separator;
receiving, into the inlet conduit, system fluid from a fluid source;
receiving, in the fluid mixing portion, separated system fluid from a feedback conduit;
mixing the system fluid with the separated system fluid to generate combined fluid;
separating the combined fluid via the second fluid separator to generate dried fluid; and
separating the dried fluid via the first fluid separator to generate the separated system fluid,
wherein the fluid mixing portion includes a constriction, and the constriction includes one or more apertures that permit fluid communication between the feedback conduit and the fluid mixing portion.

26. The method of claim 25, wherein receiving the separated fluid includes drawing system fluid into at least one of the constriction and the fluid mixing portion, via a Venturi effect.

27. The method of claim 25, wherein the feedback conduit includes a manifold disposed at an end of the feedback conduit and proximate to the one or more apertures of the constriction.

28. The method of claim 25, wherein the constriction includes a minimum diameter and the one or more apertures are disposed proximate the minimum diameter.

29. The method of claim 28, wherein the one or more apertures are disposed in the constriction between opposing outer portions.

30. The method of claim 29, wherein the opposing outer portions include diameters that are substantially equal to a diameter of a remaining portion of the inlet conduit.

* * * * *